UNITED STATES PATENT OFFICE.

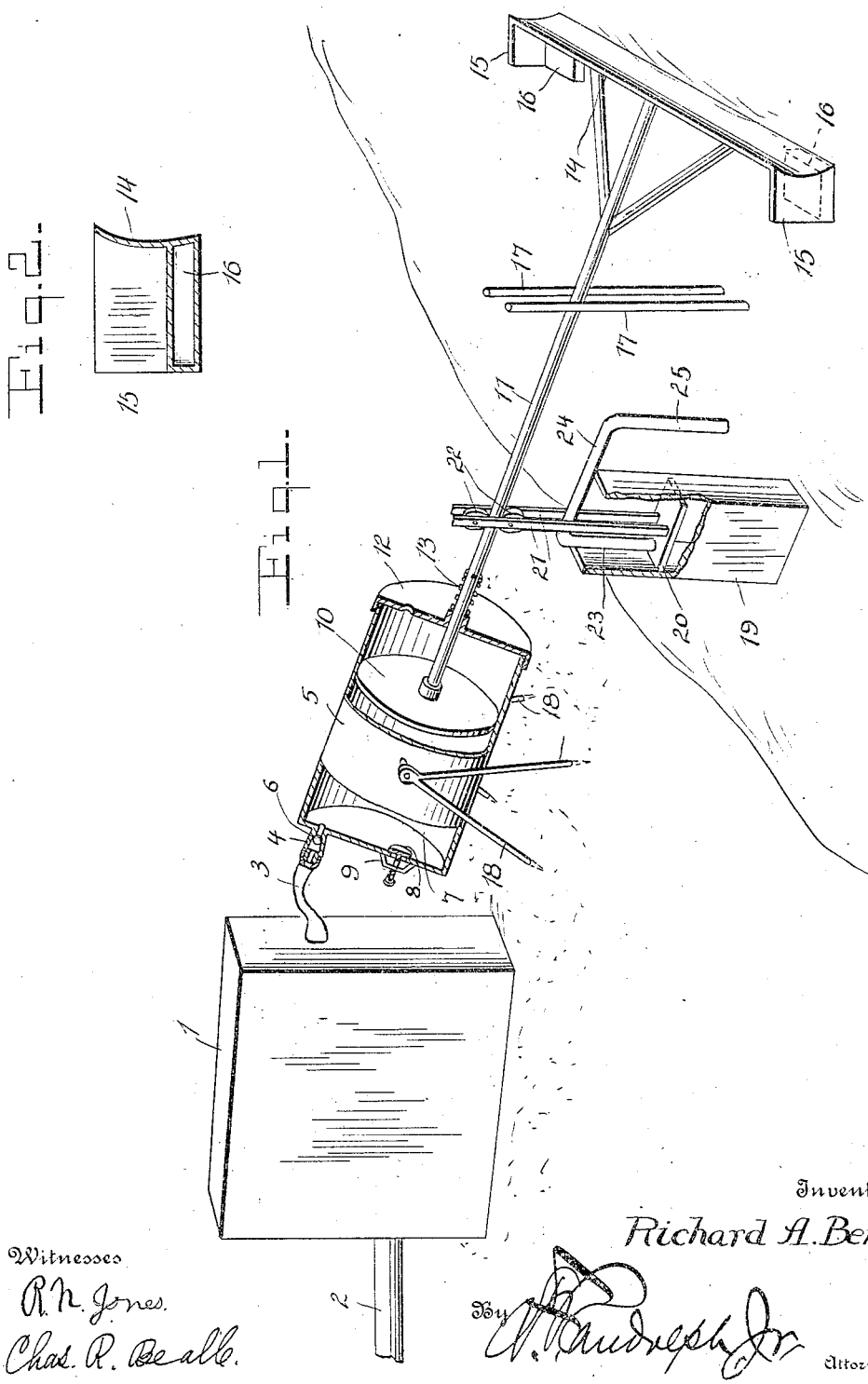

RICHARD A. BEMIS, OF SAN BERNARDINO, CALIFORNIA.

WAVE-MOTOR.

1,077,509.  Specification of Letters Patent.  Patented Nov. 4, 1913.

Application filed March 18, 1913. Serial No. 755,228.

*To all whom it may concern:*

Be it known that I, RICHARD A. BEMIS, a citizen of the United States, residing at San Bernardino, in the county of San Bernardino and State of California, have invented certain new and useful Improvements in Wave-Motors; and I do hereby declare the following to be a full, clear, and exact description of the invention, such as will enable others skilled in the art to which it appertains to make and use the same.

This invention relates to wave motors designed for the purpose of storing up the energy developed by waves of the sea and for compressing air to be utilized for any desired purpose, and one of the principal objects of the invention is to provide simple, reliable and efficient means for reciprocating a piston in a cylinder for compressing air, means being provided for storing the compressed air for future use.

Another object of the invention is to provide a reliable apparatus for the purpose referred to which will operate efficiently under varying conditions, which will not be liable to accident or injury and which will operate under the varying conditions of the tides and weather.

These and other objects may be attained by means of the construction illustrated in the accompanying drawing, in which:—

Figure 1 is a perspective view showing certain portions in section of a wave motor made in accordance with my invention; and Fig. 2 is a detail sectional view of one of the air tight floats.

Referring to the drawing, the numeral 1 designates a storing tank for compressed air, and 2 is the pipe leading from said tank to any suitable storage device. Connected to the tank 1 is a flexible pipe or hose 3, which is connected to a nipple 4 projecting from the piston cylinder 5. In the nipple 4 is a check valve 6 which is operated by the pressure in the chamber 7 to permit the compressed air to pass through the pipe 3 to the tank 1. An oppositely disposed check valve 8 is mounted in a suitable casing 9 in the head of the cylinder 5, said check valve adapted to be closed by the pressure in the chamber 7 and to be opened to admit air into the cylinder to be compressed.

A piston head 10 is mounted in the cylinder 5 and connected to the piston head 10 is a rod 11, said rod extending through an opening in the cylinder head 12 and provided with a spring 13 encircling the rod 11 outside the head 12 for returning the piston rod 11 to its outermost position after it has been forced inward by the waves. The movement of the piston rod 11 is progressive and is operated by the waves continuously and accumulatively. At the outer end of the piston rod 11 is a curved plate 14 against which the waves impinge in movement toward the shore.

It will be understood that the tank 1 and the cylinder 5 are located on the beach and that the remainder of the apparatus extends out a sufficient distance to receive the action of the waves. At the ends of the plate 14 are angular flanges 15 and at the lower sides of said flanges are air-tight compartments or floats 16 which serve to always hold the plate 14 in a substantially horizontal position. A slight rotary movement, however, may be imparted to the rod 11 and the piston head 10 without interfering with the operation of the device. Guide posts 17 are driven into the ground and the piston rod 11 is disposed between said posts to prevent lateral movement of said piston rod. The cylinder 5 is pivotally mounted on legs 18 to compensate for any slight vertical movement of the plate 14.

In order to support the piston rod 11 and prevent it from being tossed or submerged too deeply by the action of the waves, I provide a supporting device for the piston rod consisting of a well 19 having a float 20 mounted therein upon which is secured upwardly extending arms 21 spaced apart to receive the piston rod 11, and having pulleys 22 journaled therein and adapted to engage said piston rod, said pulleys 22 being preferably provided with grooved peripheries. In order to control the height of the water in the well 19 I provide a siphon consisting of a tubular member 23 connected with and extending through the float 20 at its lower end and having its upper end extending horizontally as shown at 24 and its extreme terminal extended downwardly as shown at 25 and ending below the surface of the sea. It will be understood that this supporting device will operate automatically to maintain the piston rod in proper position so that the float 14 will always be on the surface of the waves and prevent undue tossing of the float 14, for the reason that the water in the well 19, supporting the float 20, is discharged or renewed through the siphon comprising the tubes 23, 24 and 25, and the speed of the passage of the water through the siphon regulates the speed of the movement of the piston rod 11 under the influence of the waves.

The operation of my invention may be briefly described as follows: As the waves impinge upon the float 14, the piston rod 11 and piston head 10 are forced inwardly to compress the air in the chamber 7. At each inward movement of the piston head 10 the valve 6 is opened and the valve 8 is closed. When the waves recede, the check valve 6 closes and the valve 8 opens to permit a new supply of air in the chamber 7. The floats 16 serve to hold the plate 14 in substantially a horizontal position and the flanges 15 prevent lateral interference of the waves. The well 19 is partially filled with water and the siphon 25 serves to maintain the water level in the well 19 equal with that of the sea; thus the float 20 is substantially at the same level as the water outside the well 19 and in this way the piston rod 11 is always maintained at the proper level irrespective of the operation of the tides.

From the foregoing, it will be obvious that my invention is exceedingly simple in construction, will operate continuously for compressing air, cannot readily get out of order, and can be manufactured at comparatively a low cost.

I claim:

1. In a device for storing the power generated by the waves, a compression cylinder provided with oppositely disposed valves, a piston head mounted in said cylinder, a piston rod connected to said head, buoyant means for receiving impact of the waves connected to said rod, means for guiding said rod, a supporting device for said piston rod comprising a well, a float in said well, and a siphon connected to said float and extending outside the well.

2. In a device for storing the power generated by the waves, the combination of a cylinder, a piston mounted in said cylinder, a piston rod connected to said piston, means on the end of said piston rod for receiving the impact of the waves, and means for holding the piston rod in alinement with the cylinder comprising a well, a float in said well, and a siphon connected to said float and extending outside of the well.

3. In a device for storing the power generated by the waves, a cylinder, check valves in said cylinder, a piston head in said cylinder, a piston rod connected to said head, means for moving the piston rod outward, means at the outer end of the rod for receiving the impact of the waves, and a device for supporting said piston rod comprising a well, a float therein, a siphon connected to the float, and supporting arms connected to the float and provided with rollers disposed upon opposite sides of the piston rod.

In testimony whereof I affix my signature in presence of two witnesses.

RICHARD A. BEMIS.

Witnesses:
    FRANK W. LEFLER,
    GENEVIEVE CARPENTER.